United States Patent [19]

Ohouchi et al.

[11] Patent Number: 4,801,797
[45] Date of Patent: Jan. 31, 1989

[54] OPTICAL POSITION INPUT DEVICE

[75] Inventors: Junichi Ohouchi; Hiroaki Sasaki; Kazuo Hasegawa, all of Furukawa, Japan

[73] Assignee: ALPS Electric Co., Ltd., Japan

[21] Appl. No.: 84,421

[22] Filed: Aug. 10, 1987

[30] Foreign Application Priority Data

Oct. 6, 1986 [JP] Japan ................................. 61-237538
Jan. 20, 1987 [JP] Japan ................................. 62-7057[U]

[51] Int. Cl.⁴ .................................................. G01V 9/04
[52] U.S. Cl. ........................................... 250/221; 341/5
[58] Field of Search .......................... 250/221, 222.1; 340/365 P, 706, 707, 555–557, 712

[56] References Cited

U.S. PATENT DOCUMENTS 4,313,109 1/1982 Funk et al. ...................... 340/365 P
4,652,741 3/1987 Golborne ............................ 250/221

*Primary Examiner*—Edward P. Westin
*Attorney, Agent, or Firm*—Guy W. Shoup; Paul J. Winters; Stephen L. Malaska

[57] ABSTRACT

An optical position input device wherein an influence of disturbant light can be practically eliminated. The device includes a large number of light emitting elements and a large number of light receiving elements arranged in an opposing relationship along two sides and the other two sides, respectively, of directions of the X- and Y-axes. During driving scanning of the light emitting elements and the light receiving elements in the direction of the X-axis, a light reception signal developed in response to incident disturbant light from a selected one of the light receiving elements in the direction of the Y-axis is stored into a memory, and then the light reception signal is subsequently read out from the memory and is subtracted on a subtractor from a light reception signal developed from a light receiving element selected upon driving scanning for the direction of the Y-axis. The subtractor thus provides a position signal from which an influence of disturbant light has been eliminated assuredly. An influence of disturbant light is eliminated in a similar manner from a light reception signal developed from a light receiving element in the direction of the X-axis.

3 Claims, 2 Drawing Sheets

OPTICAL POSITION INPUT DEVICE

BACKGROUND OF THE INVENTION

This invention relates to an optical position input device of the type which includes means for preventing an error of detection from being caused by disturbant light.

An optical position input device is normally located in front of an image display device such as a CRT display or an LCD and is used to input coordinates to a computer. Such an optical position input device conventionally includes a large number of light emitting elements and a large number of light receiving elements arranged in an opposing paired relationship in directions of the X- and Y-axes of an outer periphery of a front surface of a screen of a CRT display or the like, and the light emitting elements and the light receiving elements are scanned to be successively selectively driven by a multiplexer so that when a light signal developed from a light emitting element is interrupted by a finger or the like during such scanning, the position at which such interruption of light occurs is detected to produce a corresponding position signal.

Such optical coordinate input devices are disclosed in U.S. Pat. Nos. 3,764,813, 3,775,560, 3,860,754 and 4,205,304, and optical coordinate input devices which include means for preventing an error of detection are disclosed in U.S. Pat. Nos. 4,243,879, 4,585,940 and 4,591,710.

By the way, if disturbant light is incident to a light receiving element, sometimes a light reception signal developed from the light receiving element may not be lowered below a predetermined value even if a light signal delivered from an opposing light emitting element is interrupted by a finger or the like. Thus, an error of detection is readily caused by disturbant light.

Technical means which eliminate an influence of disturbant light are disclosed in U.S. Pat. No. 4,243,879 and Japanese patent publication No. 61-25161.

In the technical means disclosed in Japanese patent publication No. 61-25161, just before a light emitting element and an opposing light receiving element are selectively driven, a light reception signal originating from incident disturbant light is developed from the light receiving element and is held in memory. Then, the light reception signal thus held in memory is subtracted from a light reception signal developed from the light receiving element when it is selectively driven in order to produce a signal indicative of whether or not the light signal has been interrupted.

According to the technical means mentioned just above, if only disturbant light is incident to a light receiving element just before the light receiving element is selectively driven, a light reception signal corresponding to disturbant light at a preceding point of time nearest to the point of time at which the light receiving element is selectively driven can be subtracted from a light reception signal developed from the light receiving element when the light receiving element is selectively driven, and consequently, correcting operation to eliminate an influence of disturbant light can substantially accurately follow such disturbant light which is varying in intensity.

By the way, in order to finely detect a position signal on a screen, the pitch of light emitting elements and light receiving elements to be arranged in directions of the X- and Y-axes must be fine. However, since light emitting elements have a wide directivity, a light signal delivered from a light emitting element tends to be received not only by an opposing light receiving element but also by light receiving elements which are located adjacent the opposing light receiving element and not opposed to the light emitting element. Therefore, the technical means disclosed in Japanese patent publication No. 61-25161 has a drawback that light receiving elements cannot be arranged by a pitch finer than the width of a zone irradiated by a light signal delivered from a light emitting element. To the contrary, if the directivity of light emitting elements is made sharper, the light emitting elements will be more expensive, and this will not present a practical solution to the drawback.

SUMMARY OF THE INVENTION

It is an object of the present invention to provide an optical position input device which can resolve such problems of the conventional arrangements as described above and wherein an influence of disturbant light can be practically eliminated.

In order to attain the object, according to the present invention, an optical position input device of the type which includes a plurality of light emitting elements arranged along each of two sides of directions of the X- and Y-axes, a plurality of light receiving elements arranged along each of the other two sides of the directions of the X- and Y-axes in an opposing relationship to the light emitting elements, a first multiplexer for scanning to successively selectively drive the light emitting elements, and a second multiplexer for successively selecting the light receiving elements opposing to the selectively driven light emitting elements, whereby when a light signal developed from a selectively driven one of the light emitting elements is not received by a particular one of the light receiving elements opposing to the selectively driven light emitting element, a position signal indicating that the particular light receiving element fails to receive a light signal is developed, comprises a third multiplexer for selecting one or more of the light receiving elements in the direction of the Y-axis when the light emitting elements in the direction of the X-axis are scanned to be successively selectively driven and for selecting one or more of the light receiving elements in the direction of the X-axis when the light emitting elements in the direction of the Y-axis are scanned to be successively selectively driven, a memory for receiving and storing therein light reception signals developed in response to incident disturbant light from the light receiving elements selected by the third multiplexers, means for reading out light reception signals for the direction of the Y-axis stored in the memory when the light receiving elements in the direction of the Y-axis are subsequently selected by the second multiplexer and for reading out light reception signals for the direction of the X-axis stored in the memory when the light receiving elements in the direction of the X-axis are subsequently selected by the second multiplexer, and a subtractor for subtracting a light reception signal read out from the memory from a light reception signal developed from one of the light receiving elements selected by the second multiplexer to produce an output signal from which it is to be determined whether or not a light signal developed from a selectively driven one of the light emitting elements is received by an opposing one of the light receiving elements.

Preferably, the third multiplexer may select a smaller number of ones of the light receiving elements than the total number of the light receiving elements arranged in each of the directions of the X- and Y-axes, and an average value of light reception signals from the light receiving elements selected by the third multiplexer for each of the directions of the X- and Y-axes may be stored into the memory.

Further, the optical position input device may additionally comprise a first analog to digital converter for converting light reception signals developed in response to incident disturbant light from those of the light receiving elements selected by the third multiplexer into digital values to be subsequently stored into the memory, and a second analog to digital converter for converting a light reception signal developed from one of the light receiving elements selected by the second multiplexer into a digital value from which a digital value read out from the memory is to be subsequently subtracted on the subtractor.

Thus, during driving scanning of the light emitting elements and the light receiving elements in the direction of the X-axis, a light reception signal or signals developed in response to incident disturbant light from a selected one or ones of the light receiving elements in the direction of the Y-axis are stored into the memory, and then a light reception signal for the direction of the Y-axis read out from the memory is subtracted from a light reception signal developed from one of the light receiving elements selected upon driving scanning for the direction of the Y-axis. Accordingly, when a light reception signal originating from incident disturbant light is developed from a light receiving element, a light signal developed from an opposing light emitting element is never received by the light receiving element. Therefore, the light receiving elements can be arranged in a fine pitch, and besides an influence of disturbant light can be eliminated assuredly. An influence of disturbant light can be eliminated in a similar manner from a light reception signal developed from a light receiving element in the direction of the X-axis.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
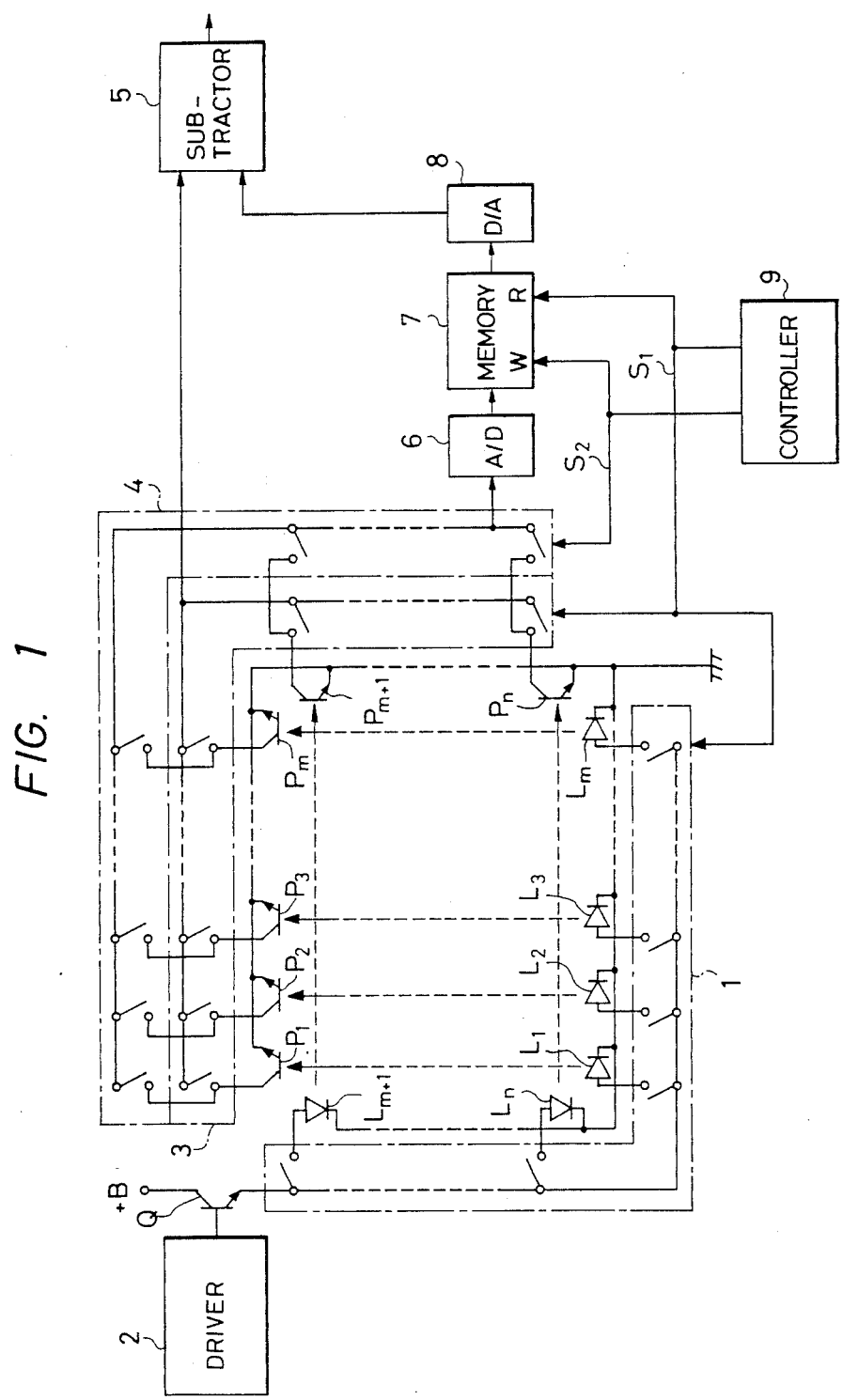
FIG. 1 is a block circuit diagram illustrating an optical position input device according to a first embodiment of the present invention.

Referring first to FIG. 1, there is shown an optical position input device according to a first embodiment of the present invention. The optical position input device shown includes a large number of light emitting diodes L1 to Ln serving as light emitting elements arranged in rows along two adjacent sides of directions of the X- and Y-axes of an outer periphery of a front surface of an image display device such as a CRT display or the like, and a large number of phototransistors P1 to Pn serving as light receiving elements arranged in rows along the other two adjacent sides of the directions of the X- and Y-axes and in an opposing relationship to the light emitting diodes L1 to Ln, respectively. Here, it is assumed that the light emitting diodes L1 to Lm and the light receiving elements P1 to Pm are arranged in the rows of the direction of the X-axis while the light emitting diodes Lm+1 to Ln and the light receiving elements Pm+1 to Pn are arranged in the rows of the direction of the Y-axis. The cathodes of the light emitting diodes L1 to Ln and the emitters of the phototransistors P1 to Pn are all grounded. Meanwhile, the anodes of the light emitting diodes L1 to Ln are connected to a first multiplexer 1 which has a common line connected to the emitter of a driving transistor Q. The base of the driving transistor Q is connected to receive driving clock signals from a driving circuit 2 while the collector is connected to a power supply terminal +B. The collectors of the phototransistors P1 to Pn are connected to second and third multiplexers 3, 4. A common line of the second multiplexer 3 is connected to one of two input terminals of a subtractor 5 while a common line of the third multiplexer 4 is connected to an analog to digital (A/D) converter 6. An output terminal of the analog to digital converter 6 is connected to an input terminal of a memory 7 which has an output terminal connected to an input terminal of a digital to analog converter 8 which in turn has an output terminal connected to the other input terminal of the subtractor 5. An output terminal of the subtractor 5 is connected to a judging circuit (not shown) for judging whether or not a light signal is interrupted. It is to be noted that driving scanning of the first and second multiplexers 1, 3 and reading of the memory 7 are controlled suitably by a first scanning signal S1 which is delivered from a controlling circuit 9 while driving scanning of the third multiplexer 4 and writing of the memory 7 are controlled suitably by a second scanning signal S2 which is developed from the controlling circuit 9.

With the construction described above, the first and second multiplexers 1, 3 first scan to successively selectively drive the light emitting diodes L1 to Lm and the phototransistors P1 to Pm in the direction of the X-axis in response to first scanning signals S1 developed from the controlling circuit 9. In the meantime, the third multiplexer 4 successively selects the phototransistors Pm+1 to Pn in the direction of the Y-axis in response to second scanning signals S2 developed from the controlling circuit 9, and light reception signals thus developed from the phototransistors Pm+1 to Pn in response to disturbant light incident to the latter are converted into digital values by the analog to digital converter 6 and then stored into the memory 7. Subsequently, in response to further first scanning signals S1, the first and second multiplexers 1, 3 scan to successively selectively drive the light emitting diode Lm+1 to Ln and the phototransistors Pm+1 to Pn in the direction of the Y-axis. In the meantime, the third multiplexer 4 successively selects the phototransistors P1 to Pm in the direction of the X-axis in response to further second scanning signals S2, and light reception signals developed from the phototransistors P1 to Pm in response to disturbant light incident to the latter are stored in the memory 7 as digital values.

Subsequently, the first and second multiplexers 1, 3 scan again to successively selectively drive the light emitting diodes L1 to Lm and the phototransistors P1 to Pm in the direction of the X-axis in response to still further scanning signals S1, and light reception signals thus developed from the phototransistors P1 to Pm are delivered successively to the subtractor 5. At the same time, the light reception signals which precedently developed from the selected phototransistors in response to incident disturbant light and stored in the memory 7 are successively read out of the memory 7, converted into analog values by the digital to analog converter 8, and delivered to the subtractor 5. Subsequently, the first and second multiplexers 1, 3 scan to successively selectively drive the light emitting diodes Lm+1 to Ln and the phototransistors Pm+1 to Pn in the direction of the Y-axis, and light reception signals thus developed from the phototransistors Pm+1 to Pn and light reception signals read out in corresponding relationship from the memory 7 and originating from incident disturbant light are both delivered to the subtractor 5.

It is to be noted that while the first and second multiplexers 1, 3 scan in the direction of the X-axis, the third multiplexer 4 scans in the direction of the Y-axis so that light reception signals originating from incident disturbant light are stored into the memory 7, and while the the first and second multiplexers 1, 3 scan in the direction of the Y-axis, the third multiplexer 4 scans in the direction of the X-axis so that light reception signals originating from incident disturbant light are stored into the memory 7.

Accordingly, the subtractor 5 develops signals of results of operations to subtract light reception signals developed precedently from the phototransistors in response to incident disturbant light from light reception signals developed from the phototransistors being selected with an influence of disturbant light eliminated from the signals. Thus, during driving scanning of the light emitting diodes L1 to Lm in the direction of the X-axis, light reception signals produced in response to incident disturbant light from the phototransistors Pm+1 to Pn in the direction of the Y-axis are stored into the memory 7, and during scanning of the light emitting diodes Lm+1 to Ln in the direction of the Y-axis, light reception signals produced in response to incident disturbant light from the phototransistors P1 to Pm in the direction of the Y-axis are stored into the memory 7. Consequently, light signals developed from the light emitting diodes L1 to Ln will never be received by the phototransistors P1 to Pn which are then operating to detect light signals originating from disturbant light. Accordingly, the phototransistors P1 to Pn can be arranged in a fine pitch to finely detect position inputs without the necessity of sharpening the directivity of the light emitting diodes L1 to Ln.

While in the embodiment described above the third multiplexer 4 successively selects all of the phototransistors P1 to Pn to cause light reception signals originating from incident disturbant light to be successively stored into the memory 7, it is also possible to make such a modification that the third multiplexer 4 selects several particular ones of the phototransistors in each of the directions of the X- and Y-axes and averages of light reception signals produced in response to incident disturbant light from the selected phototransistors in the directions of the X- and Y-axes are stored into the memory 7. In particular, averages of light reception signals produced in response to incident disturbant light from, for example, three transistors at the center and opposite ends in each of the directions of the X- and Y-axes of an image display device such as a CRT display or the like may be regarded as influences of incident disturbant light in the directions of the X- and Y-axes. By regarding averages of disturbant light incident to particular transistors as influences of incident disturbant light on the individual sides in the directions of the X- and Y-axes in this manner, the storage capacity of the memory 7 can be reduced, and the operating speed of the analog to digital converter 6 and the digital to analog converter 8 can be lowered, which will allow the converters 6, 8 to be produced at a reduced cost. Particularly in an optical position input device of a small size, even if disturbant light incident to a single phototransistor around the center of each of the directions of the X- and Y-axes is regarded as a representative or average, this will be sufficient for practical use.

It is to be noted that light reception signals to be stored in the memory 7 are not limited to digital values converted by the analog to digital converter 6, and it is a matter of course that analog values may be stored into the memory as they are.

Now, a second embodiment of the invention will be described in detail with reference to a block circuit diagram of FIG. 2. It is to be noted here that like elements or components in FIG. 2 are denoted by like reference numerals or symbols to those of FIG. 1 and detailed description thereof will be omitted herein to avoid redundancy.

Figure 2:
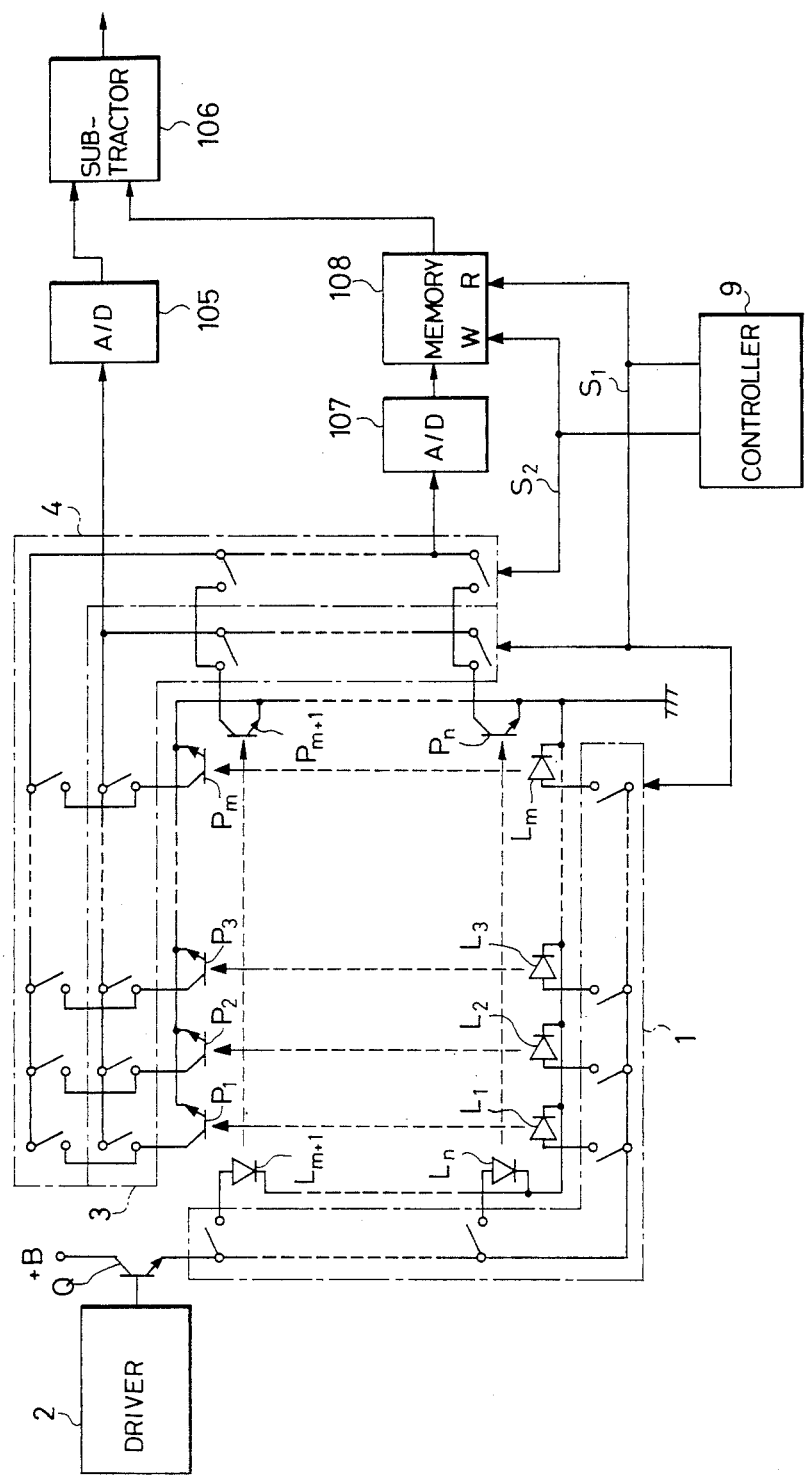
FIG. 2 is a similar view but illustrating another optical position input device according to a second embodiment of the invention.

In the circuit of the optical position input device shown in FIG. 2, a common line of a second multiplexer 3 is connected to an input terminal of an analog to digital converter 105 which has an output terminal connected to one of input terminals of a subtractor 106. Meanwhile, a common line of a third multiplexer 4 is connected to an input terminal of another analog to digital converter 107 which has an output terminal connected to an input terminal of a memory 108. An output terminal of the memory 108 is connected to the other input terminal of the subtractor 106. An output terminal of the subtractor 106 is connected to a judging circuit (not shown) which may be constituted from a digital appliance such as a microcomputer or the like for judging whether or not a light signal is interrupted. It is to be noted that driving scanning of the first and second multiplexers 1, 3 and reading of the memory 108 are controlled suitably by a first scanning signal S1 which is delivered from a controlling circuit 9 while driving scanning of the third multiplexer 4 and writing of the memory 108 are controlled suitably by a second scanning signal S2 which is developed from the controlling circuit 9.

With the construction described above, the first and second multiplexers 1, 3 first scan to successively selectively drive the light emitting diodes L1 to Lm and the phototransistors P1 to Pm in the direction of the X-axis in response to first scanning signals S1 developed from the controlling circuit 9. In the meantime, the third multiplexer 4 successively selects the phototransistors Pm+1 to Pn in the direction of the Y-axis in response to second scanning signals S2 developed from the controlling circuit 9, and light reception signals thus developed from the phototransistors Pm+1 to Pn in response to disturbant light incident to the latter are converted into digital values by the analog to digital converter 107 and then stored into the memory 108. Subsequently, in response to further first scanning signals S1, the first and second multiplexers 1, 3 scan to successively selectively drive the light emitting diode Lm+1 to Ln and the phototransistors Pm+1 to Pn in the direction of the Y-axis. In the meantime, the third multiplexer 4 successively selects the phototransistors P1 to Pm in the direction of the X-axis in response to further second scanning signals S2, and light reception signals developed from the phototransistors P1 to Pm in response to disturbant light incident to the latter are stored in the memory 108 as digital values.

Subsequently, the first and second multiplexers 1, 3 scan again to successively selectively drive the light emitting diodes L1 to Lm and the phototransistors P1 to Pm in the direction of the X-axis in response to still further scanning signals S1, and digital values converted by the analog to digital converter 105 from analog values of light reception signals thus developed from the phototransistors P1 to Pm are delivered successively to the subtractor 106. At the same time, the digital values of the light reception signals which were precedently developed from the selected phototransistors in response to incident disturbant light and stored in the memory 108 are successively read out of the memory 108 and delivered to the subtractor 106. Subsequently, the first and second multiplexers 1, 3 scan to successively selectively drive the light emitting diodes Lm+1 to Ln and the phototransistors Pm+1 to Pn in the direction of the Y-axis, and digital values of light reception signals thus developed from the phototransistors Pm+1 to Pn and digital values of light reception signals read out in corresponding relationship from the memory 108 and originating from incident disturbant light are both delivered to the subtractor 106.

It is to be noted that while the first and second multiplexers 1, 3 scan in the direction of the X-axis, the third multiplexer 4 scans in the direction of the Y-axis so that light reception signals originating from incident disturbant light are stored into the memory 108, and while the the first and second multiplexers 1, 3 scan in the direction of the Y-axis, the third multiplexer 4 scans in the direction of the X-axis so that digital values of light reception signals originating from incident disturbant light are stored into the memory 108.

Accordingly, the subtractor 106 develops signals of results of operations to subtract digital values of light reception signals developed precedently from the phototransistors in response to incident disturbant light from digital values of light reception signals developed from the phototransistors being selected with an influence of disturbant light eliminated from the signals. Thus, subtraction outputs of the digital values from the subtractor 106 are transmitted as they are to a judging circuit such as a microcomputer or the like which thus produces position signals from the digital values received and delivers them as outputs therefrom.

Further, during driving scanning of the light emitting diodes L1 to Lm in the direction of the X-axis, digital values of light reception signals produced in response to incident disturbant light from the phototransistors Pm+1 to Pn in the direction of the Y-axis are stored into the memory 108, and during scanning of the light emitting diodes Lm+1 to Ln in the direction of the Y-axis, digital values of light reception signals produced in response to incident disturbant light from the phototransistors P1 to Pm in the direction of the Y-axis are stored into the memory 108. Consequently, light signals developed from the light emitting diodes L1 to Ln will never be received by the phototransistors P1 to Pn which are then operating to detect light signals originating from disturbant light. Accordingly, the phototransistors P1 to Pn can be arranged in a fine pitch to finely detect position inputs without the necessity of sharpening the directivity of the light emitting diodes L1 to Ln.

While in the embodiment described above the third multiplexer 4 successively selects all of the phototransistors P1 to Pn to cause digital values of light reception signals originating from incident disturbant light to be successively stored into the memory 108, it is also possible to make such a modification that the third multiplexer 4 selects several particular ones of the phototransistors in each of the directions of the X- and Y-axes and averages of light reception signals produced in response to incident disturbant light from the selected phototransistors in the directions of the X- and Y-axes are stored into the memory 108. In particular, averages of digital values of light reception signals produced in response to incident disturbant light from, for example, three transistors at the center and opposite ends in each of the directions of the X- and Y-axes of an image display device such as a CRT display or the like may be regarded as influences of incident disturbant light in the directions of the X- and Y-axes. By regarding averages of disturbant light incident to particular transistors as influences of incident disturbant light on the individual sides in the directions of the X- and Y-axes in this manner, the storage capacity of the memory 108 can be reduced, and accordingly the memory 108 can be produced at a reduced cost. Particularly in an optical position input device of a small size, even if disturbant light incident to a single phototransistor around the center of each of the directions of the X- and Y-axes is regarded as a representative or average, this will be sufficient for practical use.

As apparent from the foregoing description, an optical position input device according to the present invention can eliminate an influence of disturbant light and hence can determine presence or absence of a position input with accuracy at a place where disturbant light readily changes. Further, the present invention exhibits an excellent effect that light receiving elements can be arranged in a fine pitch and hence position signals can be detected finely on an image display surface. Besides, since light reception signals are converted into digital values for subtracting operation, there is an effect that an output of a subtractor can be input as it is to a digital appliance for calculating and delivering a position signal.

Having now fully described the invention, it will be apparent to one of ordinary skill in the art that may changes and modifications can be made thereto without departing from the spirit and scope of the invention as set forth herein.

What is claimed is:

1. In an optical position input device of the type which includes a plurality of light emitting elements arranged along each of two sides of directions of the X- and Y-axes, a plurality of light receiving elements arranged along each of the other two sides of the directions of the X- and Y-axes in an opposing relationship to said light emitting elements, a first multiplexer for scanning to successively selectively drive said light emitting elements, and a second multiplexer for successively selecting the light receiving elements opposing to the selectively driven light emitting elements, whereby when a light signal developed from a selectively driven one of said light emitting elements is not received by a particular one of said light receiving elements opposing to the selectively driven light emitting element, a position signal indicating that the particular light receiving element fails to receive a light signal is developed, the improvement which comprises a third multiplexer for selecting one or more of the light receiving elements in the direction of the Y-axis when the light emitting elements in the direction of the X-axis are scanned to be successively selectively driven and for selecting one or more of the light receiving elements in the direction of the X-axis when the light emitting elements in the direction of the Y-axis are scanned to be successively selectively driven, a memory for receiving and storing therein light reception signals developed in response to incident disturbant light from the light receiving elements selected by said third multiplexer, means for reading out light reception signals for the direction of the Y-axis stored in said memory when the light receiving elements in the direction of the Y-axis are subsequently selected by said second multiplexer and for reading out light reception signals for the direction of the X-axis stored in said memory when the light receiving elements in the direction of the X-axis are subsequently selected by said second multiplexer, and a subtractor for subtracting a light reception signal read out from said memory from a light reception signal developed from one of said light receiving elements selected by said second multiplexer to produce an output signal from which it is to be determined whether or not a light signal developed from a selectively driven one of said light emitting elements is received by an opposing one of said light receiving elements.

2. An optical position input device according to claim 1, wherein said third multiplexer selects a smaller number of ones of the light receiving elements than the total number of the light receiving elements arranged in each of the directions of the X- and Y-axes, and an average value of light reception signals from the light receiving elements selected by said third multiplexer for each of the directions of the X- and Y-axes is stored into said memory.

3. An optical position input device according to claim 1, further comprising a first analog to digital converter for converting light reception signals developed in response to incident disturbant light from those of said light receiving elements selected by said third multiplexer into digital values to be subsequently stored into said memory, and a second analog to digital converter for converting a light reception signal developed from one of said light receiving elements selected by said second multiplexer into a digital value from which a digital value read out from said memory is to be subsequently subtracted by said subtractor.

* * * * *